A. W. SLEVIN, DEC'D.
E. G. SLEVIN, EXECUTOR.
RAZOR STROP AND HONE.
APPLICATION FILED APR. 16, 1917.
1,292,406.
Patented Jan. 21, 1919.
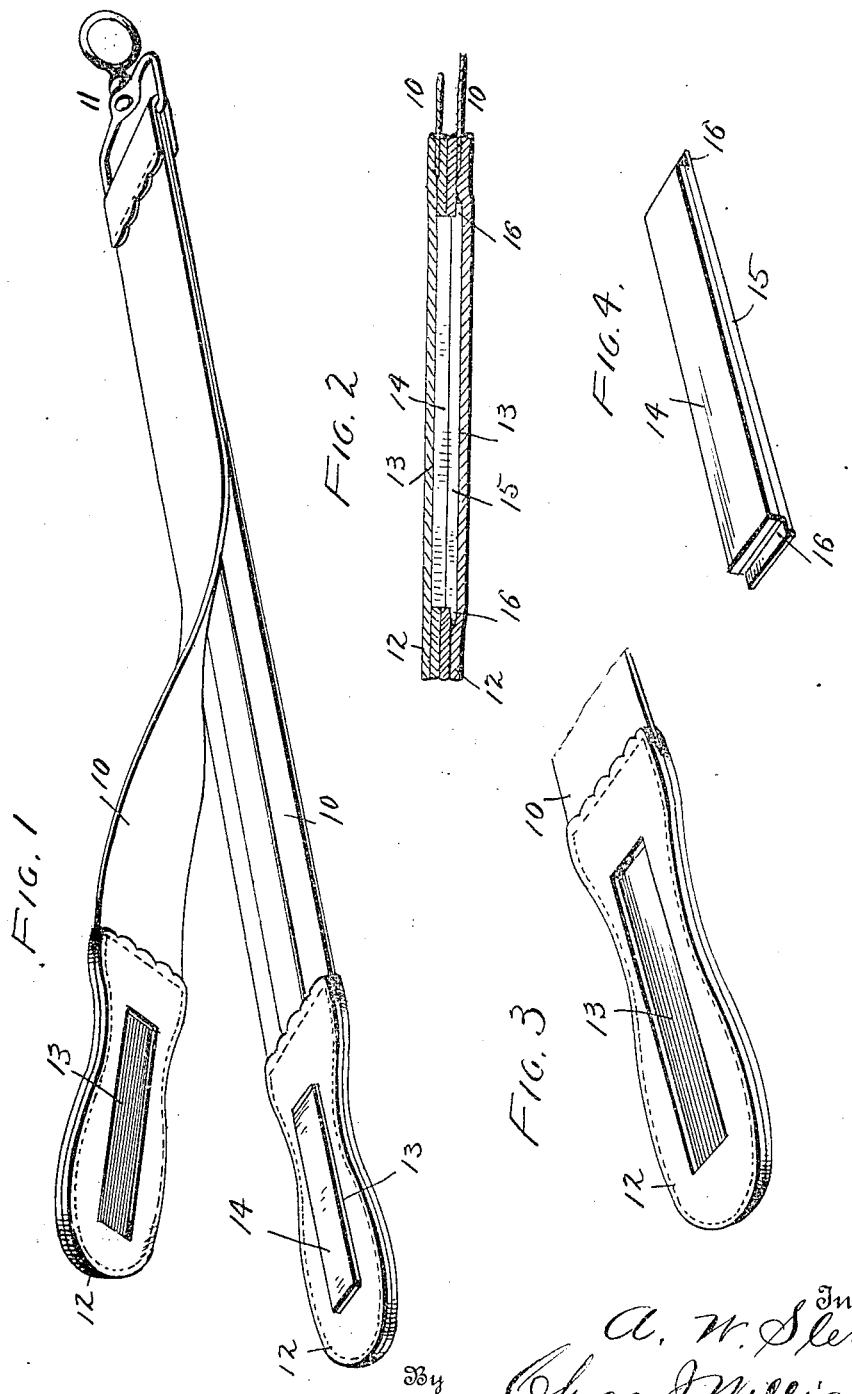
Inventor
A. W. Slevin,
By Chas. J. Williamson,
Attorney

UNITED STATES PATENT OFFICE.

ALBERT W. SLEVIN, OF ST. LOUIS COUNTY, MISSOURI; EUGENE C. SLEVIN EXECUTOR OF SAID ALBERT W. SLEVIN, DECEASED.

RAZOR STROP AND HONE.

1,292,406.

Specification of Letters Patent.

Patented Jan. 21, 1919.

Application filed April 16, 1917. Serial No. 162,409.

*To all whom it may concern:*

Be it known that I, ALBERT W. SLEVIN, a citizen of the United States, and resident of St. Louis county, in the State of Missouri, have invented a certain new and useful Improvement in Razor Strops and Hones, and do hereby declare that the following is a full, clear, and exact description thereof.

The object of my invention is to combine a razor strop and hone in such a way that both strop and hone may perfectly perform their functions without either interfering with the other and so that the hone when not being used will be protected and concealed and yet easily and conveniently available for use, and for the attainment of my object my invention consists in the combined hone and strop having the characteristics of construction and arrangement substantially as hereinafter specified and claimed.

In the accompanying drawings—

Figure 1 is a perspective view of a combined strop and hone embodying my invention;

Fig. 2 is a longitudinal section thereof, the two strop handles being shown in the position they occupy when the hone is not accessible for use;

Fig. 3 is a perspective view of the under strop handle which carries the hone, the hone being omitted;

Fig. 4 is a perspective view of the hone and its supporting base separated from the handle.

As shown in the drawings I illustrate my invention as applied to a razor strop of the type composed of two bands 10 that are joined together at one end and connected thereat to a swivel 11, and each having at its other free end a handle 12 formed of two thicknesses, or plies of heavy leather stitched together along their edges. In the inner layer, or ply of each of the handles 12 I cut or provide an oblong hole, or opening 13, thus providing in the inner side of each handle a cavity, or recess. In the recess 13 of one of the handles, which for purpose of differentiation of the two handles I shall term the under handle (the other handle being accordingly termed the top handle) I place and secure the hone 14, which has a shape and dimensions that enable it snugly to fit the recess and as the cavity 13 in the top handle is of corresponding shape to the hone and of substantially the same dimensions, it will be seen that when the two handles are together the recess in the top handle will fit over the hone and thus the latter thereby be completely housed and protected and incidentally the interlocking of the two handles that is afforded by the projection of the hone into the recess of the top handle aids in maintaining the two handles in registry as far as lateral nonalinement is concerned, and preventing sidewise movement of one handle upon the other. For securing the hone 14 to the handle, I provide a base 15 of wood, or metal or other material to which the hone is glued, said base being of oblong form and said base may be secured in place in any desired way. Thus, as illustrated in the drawings, this may be accomplished by giving it a length slightly greater than the length of the recess 13 in the handle in which it is placed so that at each end it has a lip 16 which projects under the portion of the inner handle layer adjacent the recess end. The lip 16 is preferably thinner than the body of the base so as to provide on the latter a shoulder that abuts against the adjacent end, or edge of the recess.

It is the practice to pad the handles of razor strops to give body thereto, but with my invention such padding is unnecessary as the hone serves that purpose.

Having thus described my invention what I claim is—

1. A razor strop having two flexible bands and handle members for the respective bands adapted to lie one upon another, and a hone lying between such handle members.

2. A razor strop having two flexible bands and handle members for the respective bands adapted to lie one upon another, and a hone lying between such handle members, said hone being attached to one of said handle members.

3. A razor strop having two flexible bands and handle members for the respective bands adapted to lie one upon another, and a hone lying between such handle members, said hone being attached to one of said handle members, the member to which the hone is attached being formed of several plies, or thicknesses of material, the innermost one of which has a recess for the hone.

4. A razor strop having two flexible bands and handle members for the respective bands adapted to lie one upon another, and a hone lying between such handle members, said hone being attached to one of said handle members, the member to which the hone is attached being formed of several plies, or thicknesses of material, the innermost one of which has a recess for the hone, and the hone having a base portion with lips that project under opposite edges of the recess.

In testimony that I claim the foregoing I have hereunto set my hand

ALBERT W. SLEVIN